Nov. 23, 1948.  D. E. BELL  2,454,427
DEVICE FOR REMOVING EXTRUDED PLASTER FROM
EXTERIOR SURFACES OF DENTAL FLASKS
Filed Sept. 15, 1947
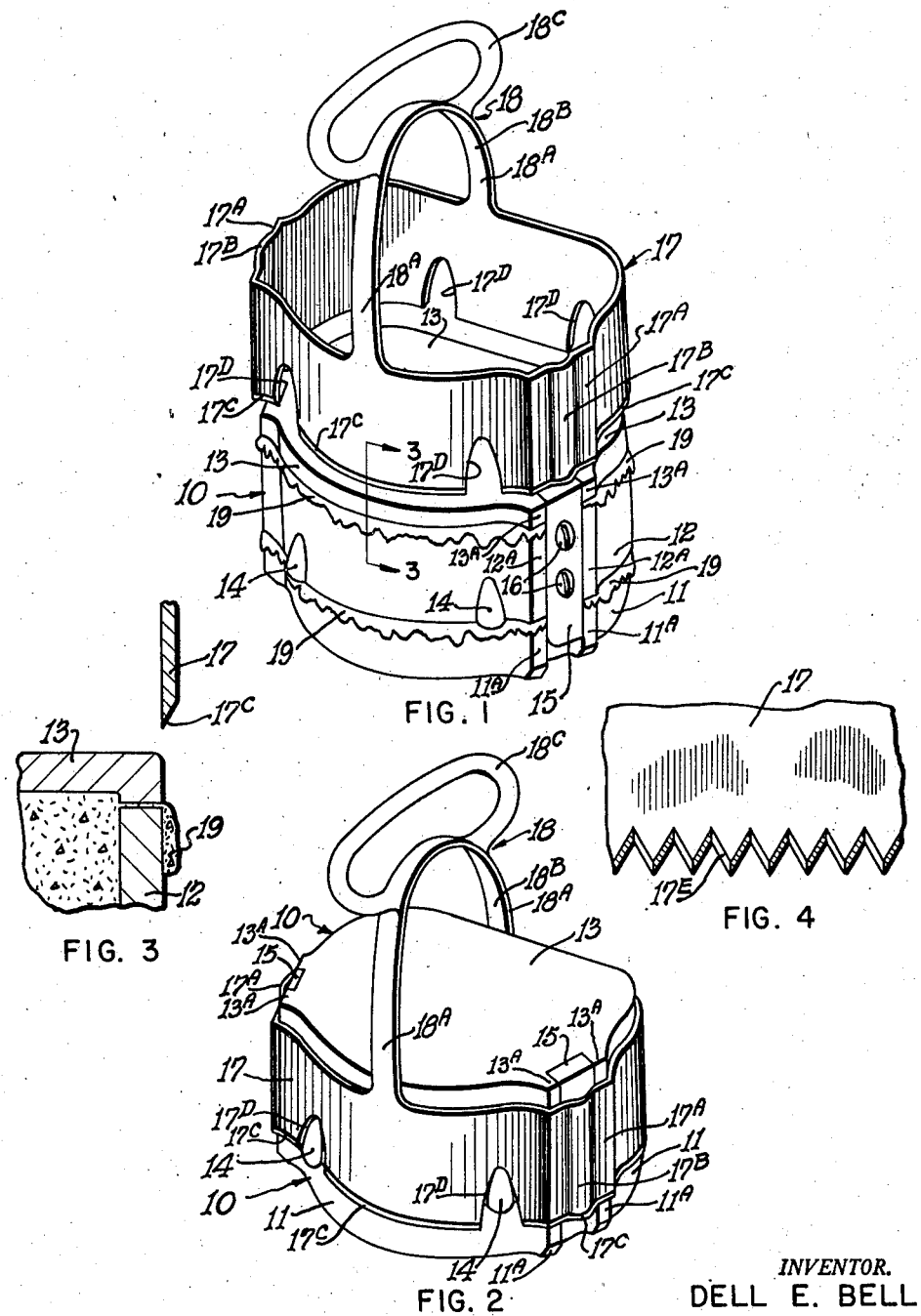
INVENTOR.
DELL E. BELL Patented Nov. 23, 1948

2,454,427

UNITED STATES PATENT OFFICE 2,454,427

DEVICE FOR REMOVING EXTRUDED PLASTER FROM EXTERIOR SURFACES OF DENTAL FLASKS

Dell E. Bell, Omaha, Nebr.

Application September 15, 1947, Serial No. 774,054

5 Claims. (Cl. 32—38)

My invention is directed to an improved device for use in dental laboratories for removing the extruded plaster from the exterior surfaces of the sides of dental flasks which are employed for curing and processing of false teeth.

In large dental laboratories where dentures are processed on a large scale of production employing many flasks, the use of my improved device becomes a valuable time-saver as a long line of many adjacently positioned flasks may be quickly and efficiently cleaned of the extruded excess plaster since the individual flasks may be successively and quickly cleaned and each by one simple stroke or movement of the device.

By the use of my improved device many necessary and advantageous results may quickly be attained in producing dentures which, without the use of my device, would require a considerably greater amount of time to produce. Among the advantages attained are the elimination of frequent changes of the hot water in which the dentures within the flasks are processed since with flasks cleaned of adhering extruded plaster the water is kept free of particles of plaster which are often permitted to pass into the plastic constituting the body structures of the denture.

Viewed in one of its aspects, the present invention has among its objects to produce a novel device for quickly and efficiently removing the excess extruded plaster from the sides of dental flasks to thereby attain the above advantages.

A further object of the present invention is to produce a device of the kind described that will not only function satisfactorily in use, but one that is simple in construction and can be manufactured at comparatively low cost.

The features of novelty whereby the present invention is characterized will hereinafter be pointed out with particularity in the claims; but, for a full understanding of the construction of the device, reference may be had to the following detailed description taken in connection with the accompanying drawing wherein:

Fig. 1 is a perspective view of a typical denture-processing flask and showing a device for removing the extruded plaster from the sides of the flask; the device shown embodies my invention in preferred form and is shown as it would be held by one hand of the operator in position over the top of the flask ready for quick downward movement to simultaneously remove the extruded plaster from all sides of the flask;

Fig. 2 is a perspective view similar to that illustrated in Fig. 1 but showing my improved plaster-removing device in its lowered position after it has performed its flask-cleaning operation;

Fig. 3 is a vertical section through the lower or cutting edge portion of the plaster-removing device and through the upper portion of the flask taken on line 3—3 of Fig. 1; and Fig. 4 is an elevation of a portion of the device showing a modified form of cutting or scraping edge thereof.

As shown in the illustrations of the accompanying drawing, the typical dental flask 10 shown preferably consists of a bottom tray section 11, a separate upper section 12 and a separate cover 13. The bottom tray section is provided with a removable wall portion in the bottom wall, however, this removable wall portion is not shown as it is not a part of my invention.

The upper section 12 is usually, and in most types of flasks now in common use, provided with a plurality of, preferably two, lugs 14 which are cast or otherwise formed integrally with and on each of two opposite sides of the wall portion of the upper section 12, and these lugs 14 are disposed below the lower half portion of upper section 12 and extend outwardly and downwardly from the outer face thereof and terminate at their lower ends in substantially semicircular flat faces in plane alignment with the laterally disposed bottom edge face of the section 12.

The lugs 14 function to support the flask 10 on a suitable support with the lower tray section 11 depending between the flask support freely suspended from the upper section 12 so that after the processing and curing of the denture embedded within the plaster has been completed and the flask cover 13 removed therefrom, the denture together with the enclosing body of plaster and the lower tray section 11 may readily be pressed out of the upper section while it is supported by the lugs 14 on the support. This operation is well understood by the operator of a dental laboratory.

It will be noted that the bottom tray section 11 and the upper section 12 as well as the cover 13 are provided with vertically aligned recesses at opposite ends of the flask formed between slightly outwardly extended pairs of portions of these three elements of the flask and these slightly outwardly extended portions are designated respectively by numerals 11A, 12A and 13A.

The three flask elements 11, 12 and 13 are maintained in alignment by a pair of alignment bars 15 which are secured, as by screws 16, to the upper section 12 between the extensions 12A; the upper portions of these alignment bars 15 being adapted to be slidably received between the extensions 13ᴬ of the cover 13 and the lower portions of these bars 15 being slidably received between the extensions 11ᴬ of the bottom tray section 11.

My improved device, however, is employed to clean the sides of the flask of extruded excess plaster before the processing and curing of the denture is started so that the hot water in which the flask is placed for processing and curing is free from particles of plaster.

My improved device consists of a scraper element 17 comprising a circuitous band of comparatively thin strip material preferably of metal and shaped to closely slidably fit against the irregular configuration of the outer face of the flask and having a suitable handle 18 having the lower ends of opposite side portions 18ᴬ connected or integrally cast with the scraper element 17 when of cast metal such as cast steel, cast iron or cast aluminum. Obviously, these parts of the scraper may be made of any material suitable for its scraping operation.

The circuitous scraper 17 is offset slightly at opposed sides, as at 17ᴬ to pass closely to the outer faces of the outwardly projecting portions 11ᴬ, 12ᴬ and 13ᴬ and its central portion is vertically troughed, as at 17ᴮ, to clear the heads of the screws 16.

The circuitous scraper 17 is provided with a sharp lower edge 17ᶜ along its entire bottom edge which is interrupted by spaced upwardly extending slots or recesses 17ᴰ to clear the lugs 14 when the device is brought into operation to scrape the sides of the flask of the extruded excess plaster which flows outwardly of the flask through the joints between the bottom and upper sections and between the upper section and the cover. The numeral 19 in Fig. 1 designates the extruded plaster for illustrative purposes.

As shown more clearly in Fig. 3, the scraping or plaster-cutting edge 17ᶜ is formed by means of beveling same, however, a sharp edge of other suitable form may be used, as for example, a tooth-like edge 17ᴱ may be employed equally as well since the plaster used which hardens on the outer face of the flask is hard and brittle and is readily chipped off in broken pieces by the downward movement of the device from the position shown in Fig. 1 to the lowermost position shown in Fig. 2 whereat the device has completely removed the plaster from all sides of the flask.

Any suitably shaped handle 18 may be employed or affixed in any suitable manner to the circuitous scraper. I prefer to construct the handle 18 as shown in the drawing as I consider it very satisfactory and as one which facilitates the quick successive operation of my device upon a great number of flasks arranged in a row for cleaning operation each by simply one downwardly movement of the device.

The handle 18, as shown in Figs. 1 and 2, consists of a bail 18ᴮ of arcuate shape connected by its opposite arms 18ᴬ to the circuitous scraper 17 and preferably cast or otherwise formed with a looped oval-shaped handle bar 18ᶜ having its ends connected or integral with spaced portions of the bail 18ᴮ.

The construction and operation of my improved device will readily be understood from the above description and attached drawing.

Various changes and modifications may be made in the construction of the parts of the device by those skilled in the art to which my invention appertains without departing from the spirit of my invention which is defined in the hereto appended claims, hence, I do not wish to be understood as limiting my invention to the preferred construction shown in the drawing for illustrative purposes.

I claim as my invention:

1. A dental flask cleaning device comprising a circuitous band shaped to closely conform to the sides of the flask and adapted to closely slidably engage the sides of the flask when the flask is embraced within said band and said band is moved downwardly to thereby scrape the excess plaster extruded through the joints between the sections of the flask, said band having a lower cutting edge interrupted by upwardly extending spaced recesses to clear spaced lugs projecting from the sides of the flask, and a handle connected to the upper edge of said band.

2. A dental flask cleaning device as set forth in claim 1, wherein said cutting edge consists of a sharp beveled face.

3. A dental flask cleaning device as set forth in claim 1, wherein said cutting edge consists of spaced pointed teeth.

4. A dental flask cleaning device as set forth in claim 1 and wherein said handle consists of an arcuate bail having its ends connected to opposite sides of said band.

5. A dental flask cleaning device as set forth in claim 1, wherein said handle consists of an arcuate bail having its ends connected to opposite sides of said band and a lopped handle portion of oval shape above said bail having its ends connected to spaced portions of said bail.

DELL E. BELL.

No references cited.